(12) United States Patent
Eitel (10) Patent No.: US 8,212,934 B2
(45) Date of Patent: Jul. 3, 2012

(54) METHOD FOR PROCESSING AN ANALOG TELEVISION SIGNAL

(75) Inventor: Ben Eitel, Gaertringen (DE)

(73) Assignee: Sony Corporation, Tokyo (JP)

( * ) Notice: Subject to any disclaimer, the term of this patent is extended or adjusted under 35 U.S.C. 154(b) by 666 days.

(21) Appl. No.: 12/389,001

(22) Filed: Feb. 19, 2009

(65) Prior Publication Data
US 2010/0208135 A1 Aug. 19, 2010

(51) Int. Cl.
*H04N 5/21* (2006.01)
*H04N 5/44* (2006.01)
*H04N 5/04* (2006.01)

(52) U.S. Cl. ......... 348/614; 348/607; 348/500; 348/725

(58) Field of Classification Search ................ 348/614, 348/607, 547, 500, 513, 526, 914, 725; 375/229, 375/354; *H04N 5/21, 5/44, 5/04, 5/475, H04N 5/08*
See application file for complete search history.

(56) References Cited

U.S. PATENT DOCUMENTS

| | | | | |
|---|---|---|---|---|
| 5,877,816 A * | 3/1999 | Kim | ............................... | 348/500 |
| 5,886,748 A * | 3/1999 | Lee | ............................... | 348/614 |
| 2004/0042546 A1* | 3/2004 | Han et al. | ..................... | 375/233 |

OTHER PUBLICATIONS

Chao, Tzy-Hong S., "Multi-Path Equalization for NTSC Video by Using Digital IIR Filter", IEEE Transactions on Consumer Electronis, vol. 34, No. 1, Feb. 1988 (pp. 268-278).
Sherratt, R.S. et al, A New Method for Multipath Channel Characterisation for Terrestrial Transmitted Video, Radio Receivers and Associated Systems, Sep. 26-28, 1995, Conference Publication No. 415 © IEE 1995 (pp. 22-25).
Lei, Zhichun, "Blinde Echoentzerrung zum Empfang von Videosignalen", University of Dortmund Doctorial Dissertation, Shaker publishing company of Aachen 2000 (pp. 1-143) with computer generated English translation.

* cited by examiner

*Primary Examiner* — Sherrie Hsia
(74) *Attorney, Agent, or Firm* — Oblon, Spivak, McClelland, Maier & Neustadt, L.L.P.

(57) ABSTRACT

A method for processing an analog television signal. A reference signal based on a field synchronizing signal of the analog television signal and equalizing the analog television signal based on the reference signal are determined. The reference signal is determined by calculating a difference between a first part of the field synchronizing signal and a second part of the field synchronizing signal, wherein the first and second parts are selected such that the reference signal is non-zero.

14 Claims, 12 Drawing Sheets

METHOD FOR PROCESSING AN ANALOG TELEVISION SIGNAL

An embodiment of the invention relates to a method for processing an analog television signal. A further embodiment of the invention relates to an analog television receiver.

BACKGROUND

For improving the quality of television images, reference signals may be used, based on which a television signal may be processed so that image artifacts due to echoes or signal distortions may be equalized.

It is an object of the invention to provide a method and a receiver, respectively, allowing the determination or improvement of a reference signal to be used for image improvement.

This object is solved by the subject matter according to the independent claims.

Further details of the invention will become apparent from a consideration of the drawings and ensuing of description.

DETAILED DESCRIPTION

In the following, embodiments of the invention are described. It is important to note, that all described embodiments in the following may be combined in any way, i.e. there is no limitation that certain described embodiments may not be combined with others.

It should be noted that the following description shows mainly examples where a signal is transmitted via a wireless channel. There is, however, no limitation that the channel be a wireless channel. The explained principles are likewise applicable if the signal is transmitted via a cable.

Figure 1:
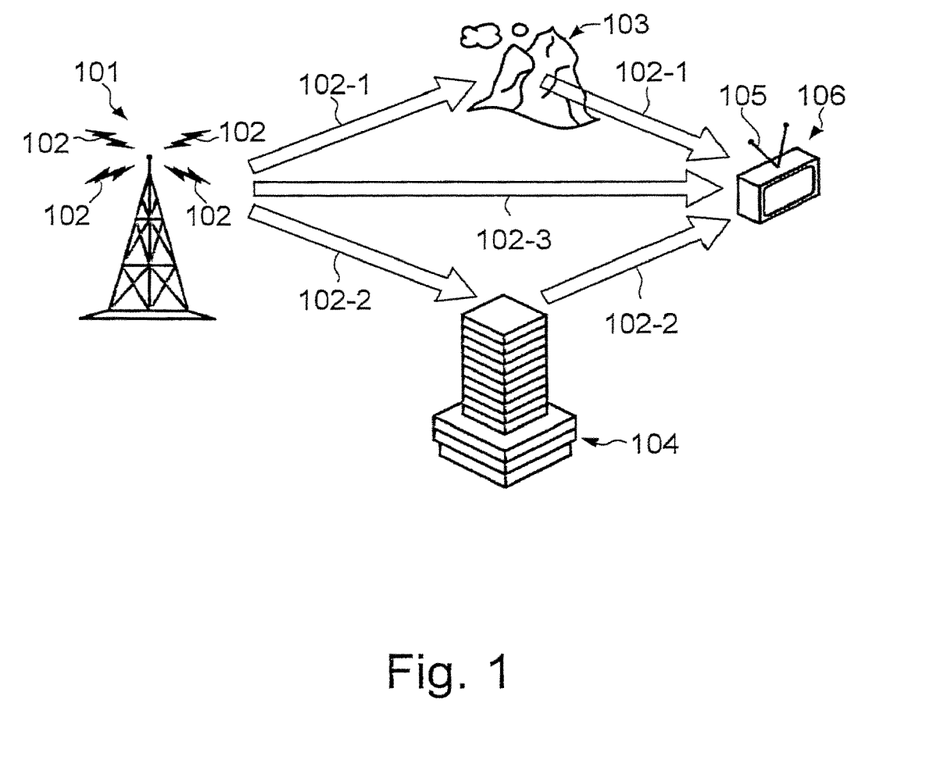
FIG. 1 shows an exemplary scenario where a distorted signal is received by a television set.

FIG. 1 shows a broadcast station 101 which may be e.g. a television broadcast station, broadcasting a television signal 102.

Television signal 102 may be received by an antenna 105 of a television set 106 of a user. However, antenna 105 may receive several parts of television signal 102, i.e. a first echo signal 102-1 of said television signal 102, a second echo signal 102-2 of said television signal 102 and a main path signal 102-3 of said television signal 102. The first echo signal 102-1 may have been caused by a first obstacle 103, e.g. a mountain. The second echo signal 102-2 may have been caused by a second obstacle 104, e.g. a building. The main path signal 102-3 is received by antenna 105 without having been reflected by any obstacle.

Thus, the signal received at antenna 105 may be a distorted signal including the main path signal 102-3 and echo signals 102-1, 102-2. The received signal may, therefore, be affected by phase shifting and amplitude attenuation. Various other distortions may also occur.

When demodulating the received signal in television set 106, the demodulated video image may have picture distortions due to the echo signals or other signal distortions.

It should be noted that although FIG. 1 and the further description shows a television signal, all of the described embodiments may also be applied in other fields of radio communication, e.g. in satellite communication, when broadcasting/receiving a radio signal and various other fields where signals need to be demodulated that may comprise echoes or be subject to distortion. For example, the explained principles may also be applied to an orthogonal frequency division multiplex (OFDM) signal. Also, it is not necessary that input signals have been transmitted wireless. All explained principles are likewise applicable if the signals were transmitted e.g. via cable.

Figure 2:
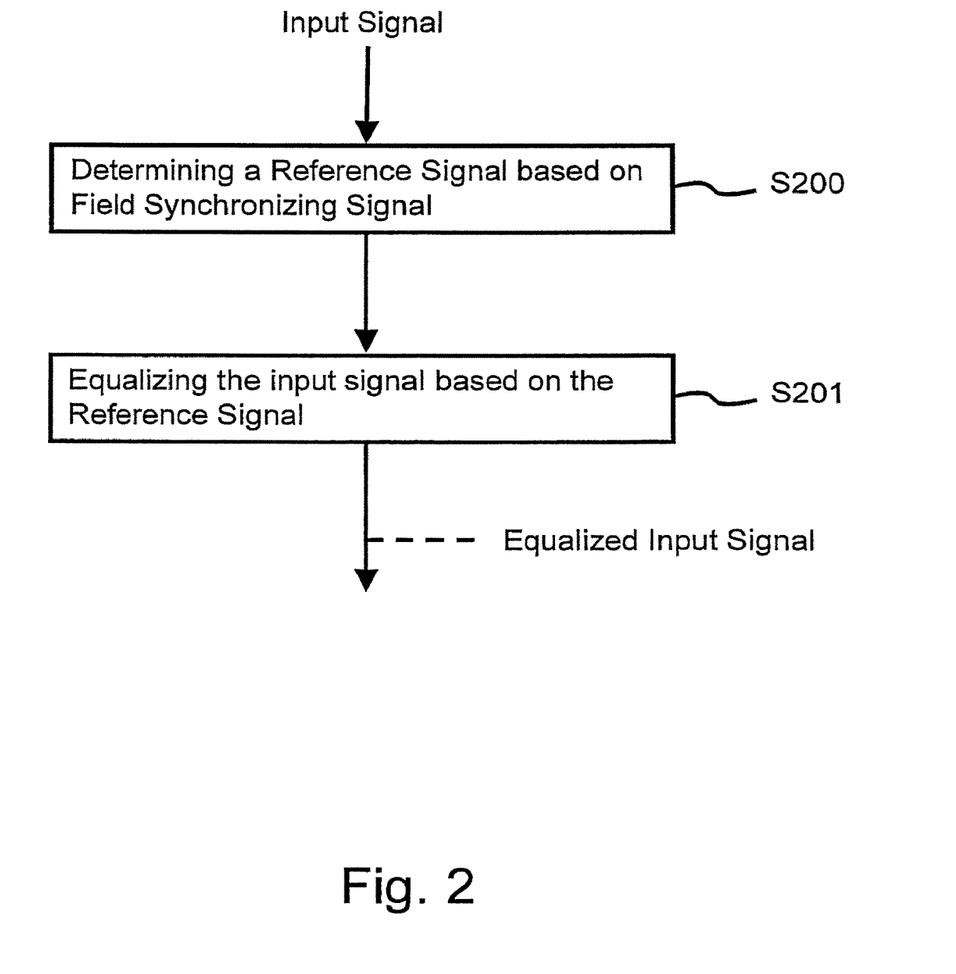
FIG. 2 shows a flowchart of the method according to an embodiment of the invention.

FIG. 2 shows a flowchart illustrating method steps for processing of an input signal. The input signal may be an analog television signal comprising a field synchronizing signal generally used for synchronizing fields of a television signal. In a first step S200, a reference signal may be determined based on the field synchronizing signal.

In step S201, the input signal may be equalized based on the reference signal determined in step S200. The result is an equalized input signal, e.g. an equalized analog television signal. That means that the input signal may be improved by equalizing distortions.

In step S200 the reference signal may be determined based on a first field synchronizing signal and a second field synchronizing signal for respectively synchronizing a first and second field of the television signal. Thereby, the reference signal may be determined based on the complete first and second field synchronizing signals for one image or only on parts thereof, e.g. first and second parts.

Further, in step S200, the reference signal may be determined by calculating a difference between the first and second parts. Thereby, the first and second parts may be determined such that the reference signal is non-zero. In other words, the reference signal may be determined or defined by selecting certain parts, i.e. the first and second parts, such that when subtracting the first and second parts from each other, the results is non-zero.

As mentioned, alternatively or additionally to using parts of field synchronizing signals, it is also possible that complete field synchronizing signals are the basis of determining the reference signal.

According to a further embodiment, the first part of the first field synchronizing signal may be determined based on a first predetermined line of the first field and the second part of the second field synchronizing signal may be determined based on a second predetermined line of the second field. Depending on the standard of the input signal, each field may have a predetermined number of lines. Thereby, the counting of the lines may start before video information is transmitted which is used for determining the picture. A predetermined line here, therefore, may refer to a line number (position) of a field. For example, the first and second predetermined lines may be the first, second, ..., n-th line of a field.

In one embodiment, the first and second predetermined lines may respectively be the first complete line of the corresponding first field and the first complete line of the corresponding second field.

In a further embodiment, prior to calculating the difference between the first and the second field synchronizing signals (or the first and second parts of the field synchronizing signals), the first and second parts may be aligned to each other. This alignment may be based on the first and second predetermined lines, i.e. e.g. on the first (complete) line of the first field and on the first (complete) line of the second field.

During the alignment, either the complete field synchronizing signals may be aligned and subtracted from each other, or only parts of the field synchronizing signals may be aligned/subtracted from each other.

It is also possible that prior to calculating the difference, the field synchronizing signals (or the first and the second parts thereof), are offset with respect to each other dependent on a standard of the analog television signal. For example, the offset may be an offset of the field synchronizing signals of one half of a line. This may be for example carried out in a case wherein a position of a predetermined line of the first field does not correspond to a position of a corresponding predetermined line of the second field. For example, the first predetermined line may be the second line and the second predetermined line may be the forth line of a respective field. In this case, an offset of the synchronizing signals may lead to a non-zero signal suitable to be used as a reference signal.

It is also possible, for example for analog television signals of other standards that the offset of the field synchronizing signals is an offset of ¾, 1.5, 2.5 or 5.5 of a line, or of other values, for example. The offset may be dependent on the standard of the analog television signal in that an offset for a first analog television signal may for example be 0.5 whereas an offset for a second analog television signal may be 2.5. One purpose of offsetting by the indicated offsets of fractions of a line is to obtain a non-zero reference signal as described above. As the examples for offset values indicate a variety of offsets are possible and the above given examples should not be seen as limiting in any sense.

The television signal, and therefore also the field synchronizing signal, may be of a predetermined broadcasting standard such as NTSC-J, NTSC-N, NTSC 4.43, PAL-B, PAL-G or SECAM standards.

According to NTSC-M standard for example, the first line of the first field is at a position which does not correspond to the position of the first line of the second field. The position of the first line of the second field is, however, only offset from the corresponding position of the first line of the first field. Accordingly, prior to calculating the difference between the first and the second field synchronizing signals or the first and second parts of the field synchronizing signals, respectively, the first part of the field synchronizing signal may be offset with respect to the second part of the field synchronizing signal. Thus, the first line of the first field is aligned with the first line of the second field.

According to a further embodiment, the equalizing may be done based on an ideal, i.e. substantially undistorted, field synchronizing signal or reference signal. When equalizing, this (ideal) reference signal may be compared to a reference signal derived from a received (and therefore non-ideal, i.e. distorted) field reference signal.

In other words, a further reference signal may be derived from a distorted field synchronizing signal in the same manner as the reference signal from the undistorted field synchronizing signal. Then, the equalizing may be based on a comparison between the reference signal and the further reference signal.

Figure 3:
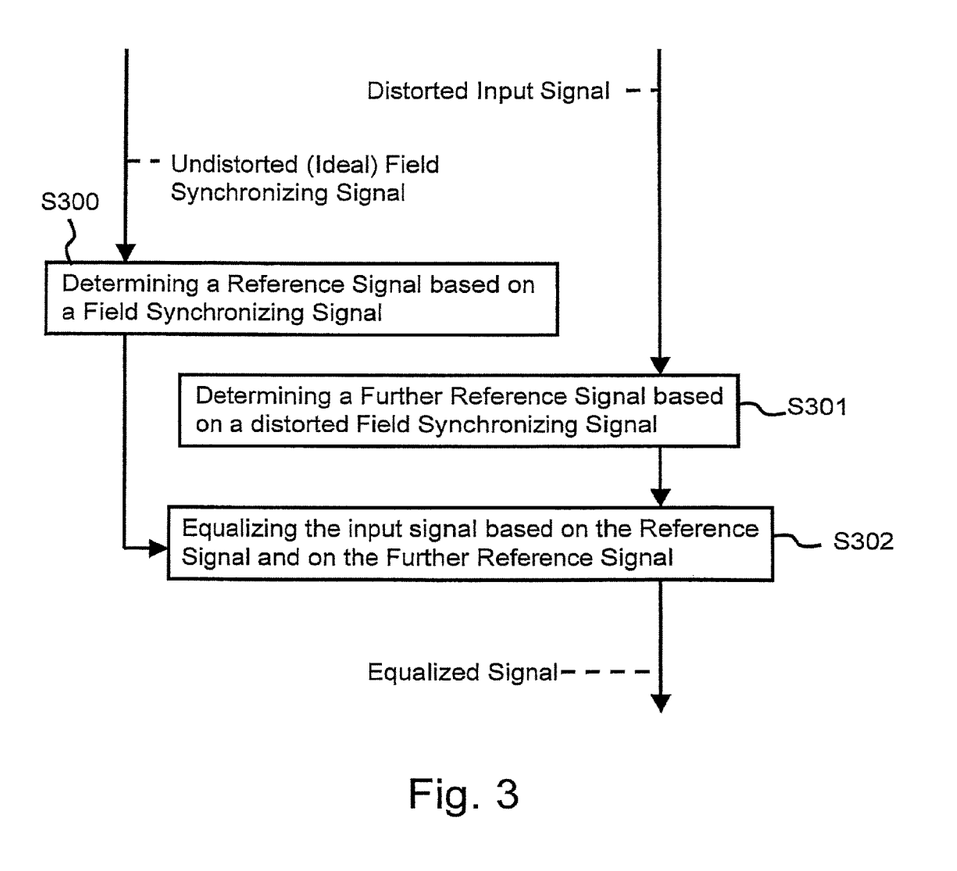
FIG. 3 shows a flowchart of the method according to a further embodiment of the invention.

This is illustrated in FIG. 3. In step S300, a (ideal) reference signal is determined based on an undistorted field synchronizing signal. The undistorted field synchronizing signal may e.g. be stored in a receiver.

In step S301, in parallel to step S300, a further reference signal is determined on the basis of a distorted field synchronizing signal. The distorted field synchronizing signal may result from signal transmission via a distorted path such as due to phase shifting and/or echoes and reflections of signals causing a deterioration of the signal quality, i.e. signal amplitude, signal integrity or signal timing (cf. FIG. 1).

In step S302, the input signal is equalized based on the (ideal) reference signal and the further reference signal. The result of the equalizing is an equalized signal which may be used further e.g. to generate a good quality television picture.

Figure 4:
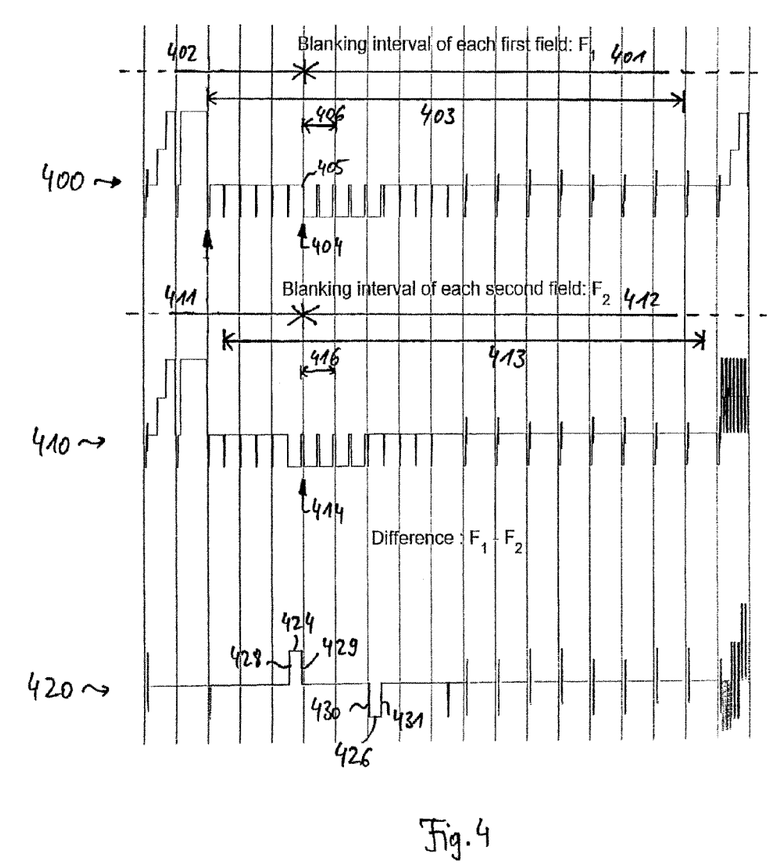
FIG. 4 shows diagrams of signals for illustrating an embodiment of the invention.
Figure 5:
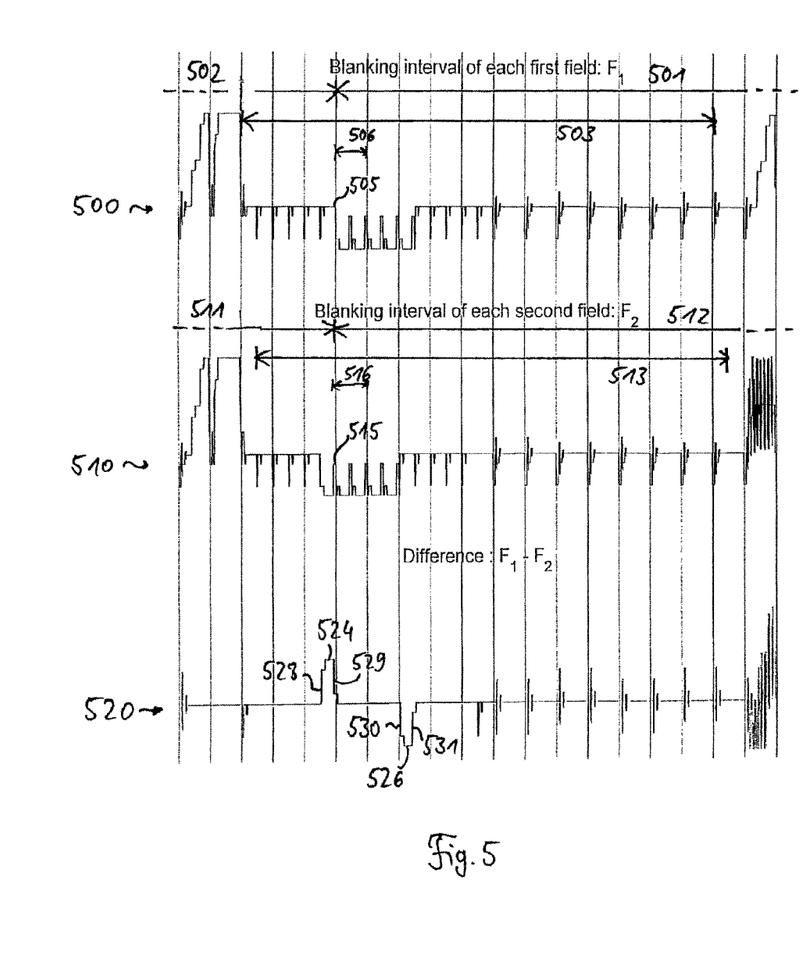
FIG. 5 shows diagrams of further signals for illustrating an embodiment of the invention.
Figure 6:
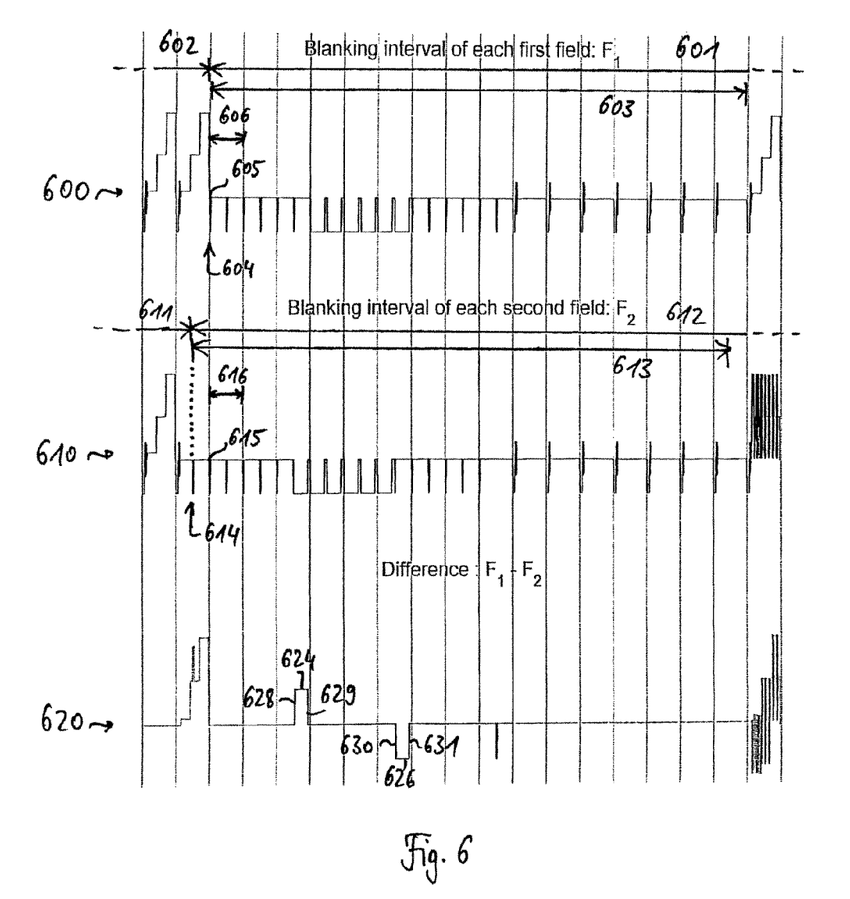
FIG. 6 shows diagrams of further signals for illustrating an embodiment of the invention.
Figure 7:
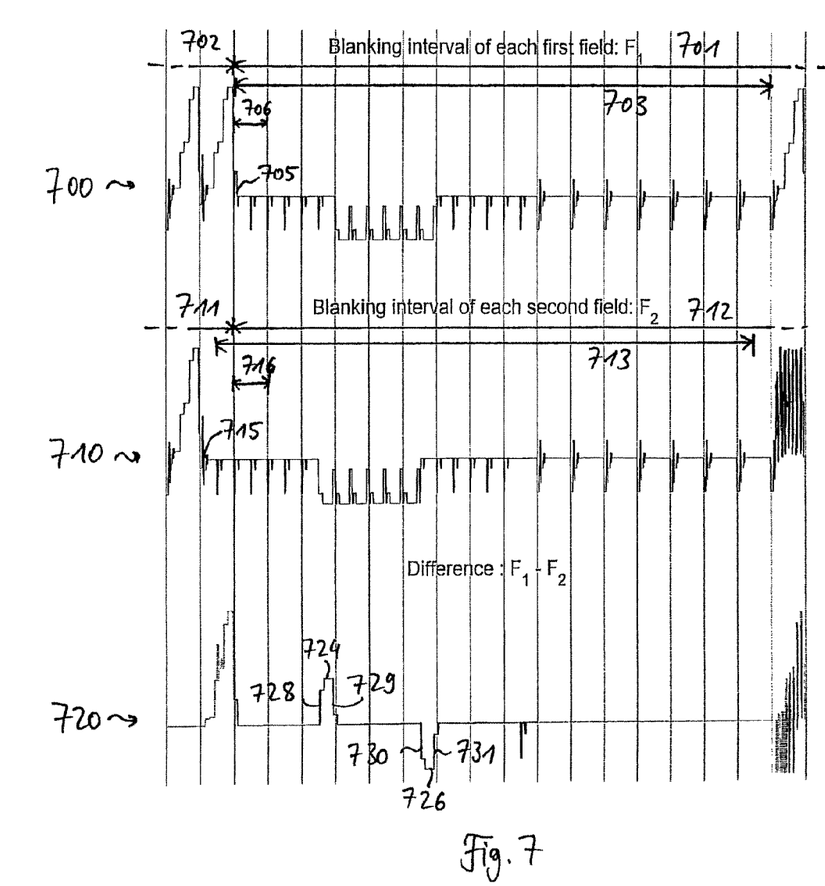
FIG. 7 shows diagrams of further signals for illustrating an embodiment of the invention.

FIGS. 4 to 7 show a plurality of signals for better understanding embodiments of the invention. Thereby, FIGS. 4 and 6 show undistorted field synchronizing signals and undistorted (ideal) reference signals and FIGS. 5 and 7 show distorted field synchronizing signals and distorted reference signals, respectively. Further, FIGS. 4 and 5 relate to systems that may be referred to as "all but M systems" such as e.g. NTSC-J, NTSC-N, NTSC 4.43, PAL-B, PAL-G and FIGS. 6 and 7 relate to "M systems" such as NTSC-M.

For equalizing the ideal reference signals of FIGS. 4 and 6 may be respectively compared to the (distorted) reference signals derived from a received analog television signal.

FIG. 4 shows a first signal 400 having a part of a first field 401 and a part of second field 402. The first and second fields 401, 402 may be field of one television picture (frame). As mentioned above, FIG. 4 shows "ideal" signals i.e. as specified in the corresponding spec for the standard, e.g. ITU-R BT.470-6.

For each of first 401 and second 402 fields, a respective field synchronizing signal may be provided which may not contain television picture information but may be used for synchronizing all first and second fields and thereby the lines of television pictures. Reference sign 403 denotes a first field synchronizing signal of first field 401. As seen, the field synchronizing signal may be in the blanking interval of the signal.

First field 401 and second field 402 are adjacent to each other. Further, first field 401 starts with first field synchronizing signal 403. According to the television standard, position 405 marks the beginning of a first line 406 of first field 401. First line 406 is the first complete line of first field 401.

FIG. 4 shows a further signal 410 having a further first field 411 and a further second field 412. The further first field 411 may be the same field as first field 401 of signal 400. Further second field 412 and further first field 411 contain, as explained above, field synchronizing signals. Further second field 412 contains a second field synchronizing signal 413. Further first field 411 and further second field 412 are adjacent to each other. According to the television standard, position 414 marks the beginning of a first line 416 of further second field 412. First line 416 of further second field 412 is the first complete line of further first field 412.

Signal 420 in FIG. 4 is the difference signal which is obtained when subtracting signal 400 from signal 410.

In order to determine difference signal 420, signals 400 and 410 may be aligned as shown in FIG. 4. The alignment may be as shown, i.e. such that the beginnings 404, 414 of the first lines (predetermined lines) of the first and second fields coincide.

As can be seen, the difference signal is non-zero and has two rectangular shaped parts 424, 426 defining respective rising and falling edges. Rectangular part 424 has a rising edge 428 and a falling edge 429. Rectangular part 426 has a rising edge 430 and falling edge 431. These rising and falling edges may be used for comparing this (ideal) reference signal 420 with a further reference signal determined in the same manner for a received field synchronizing signal.

For the majority of standards of the television signal and the respective field synchronizing signal, respectively, which is in particular not the NTSC-M standard, the field synchronizing signals and the positions of the respective first lines are similar. Therefore, reference signal 421 may be similar as depicted in FIG. 4 for the majority of standards except for the NTSC-M standard, wherein for example the positions of the first complete lines in the fields diverge from those according to non-NTSC standards.

FIG. 5 shows two signals 500, 510 having first and second field synchronizing signals 503, 513 derived from a received (distorted) analogue television signal. As can be seen, signals 500, 510 deviate from the (ideal) signals 400, 410 in FIG. 4.

Similar as in FIG. 4, reference signs 506 and 516 respectively mark the first lines of a first field 501 and a second field 512, i.e. reference signs 505 and 515 respectively mark the beginnings of first lines 506, 516. As in FIG. 4, first and second fields 501, 512 may be subsequent fields, so that in fact the field denoted with reference sign 511 is the first field 501.

Again, similar as in FIG. 4, a difference signal 520 (further reference signal) is determined by subtracting signal 510 from signal 500. Prior to calculating the difference, signals 500 and 510 are aligned so that the beginnings 505, 515 of the first lines 506, 516 coincide.

As shown, difference signal 520 has parts 524, 526 with a rectangular shape with respective rising and falling edges. For equalizing the analogue television signal from which the field synchronizing signals 503, 513 have been derived, these edges may be compared to corresponding edges of signal 420 in FIG. 4.

It should be noted that although FIGS. 4 and 5 show to derive respective reference signals 420, 520 by subtracting substantially the complete second field synchronizing signals 413, 513 from the complete first field synchronizing signals 403, 503, this is not necessary. In order to obtain a rising or falling edge suitable for equalizing, it might be enough to only subtract suitable parts of the field synchronizing signals from each other. It may for example be sufficient to subtract only one line of one synchronization signal from one line of another synchronization signal. For example, in FIGS. 4 and 5 it would be enough to only subtract the first five or six lines of the first/second field synchronizing signal from each other, i.e. so many lines until the first falling edge (edges 430, 530) occurs. The selected parts based on which the reference signal and further reference signal are determined should, however, be selected so that the resulting reference signal is non-zero, i.e. an edge occurs that is suitable for equalizing.

As mentioned above, FIGS. 6 and 7 relate to M-systems, i.e. e.g. to systems of the NTSC-M standard. FIG. 6 is similar to FIG. 4 in that FIG. 6 shows the determination of a reference signal 620 based on undistorted field synchronizing signals and FIG. 7 is similar to FIG. 5 in that FIG. 7 shows the determination of a further reference signal 720 based on distorted field synchronizing signals derived from a received analogue television signal.

Similar reference signs denote similar elements as before, i.e. 603, 613 respectively denote a first and second field synchronizing signal for synchronizing first and second fields 601, 612. Further, 606, 616 are first lines of the first and second fields, respectively. 604, 614 mark beginnings of the first lines 606, 616, which beginnings are used for alignment. Then, the reference signal 620 is described as explained before, i.e. by subtracting signal 610 from signal 600.

The reference and further reference signals in FIGS. 4 to 7 have been calculated by aligning the respective field synchronizing signals based on respective first (complete) lines as predetermined lines. As mentioned, this is, however, not necessary. An alignment may also be based on other predetermined lines, e.g. based on the second complete line of a first field and on a fifth complete line of a second field. Various modifications for the alignment are possible, i.e. the alignment may be done in many different ways, as long as a signal, e.g. an edge, suitable for equalization can be determined.

As mentioned, FIG. 7 shows the determination of a further reference signal for M-systems. The further reference signal is thereby determined in the same manner as the reference signal in FIG. 6, however, based on (distorted) field synchronizing signals derived from a received analogue television signal.

With respect to FIGS. 4 to 7, it should also be noted that it is possible to subtract only aligned predetermined lines from each other in order to save computation time. For example, the signals may only be subtracted from each other in regions where rising/falling edges of the (further) reference signals are expected.

Figure 8:
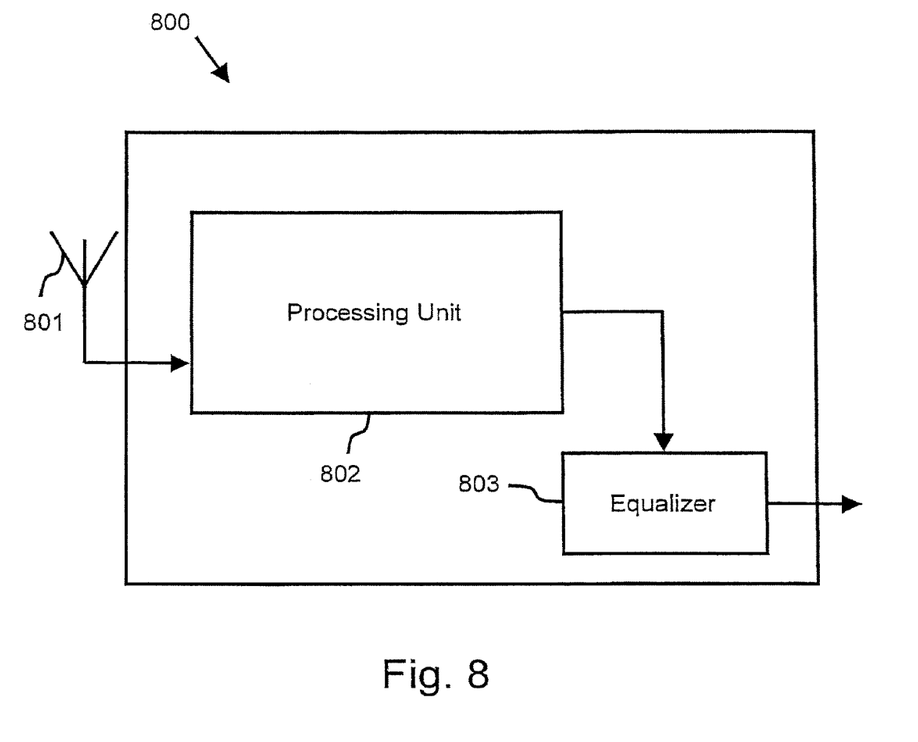
FIG. 8 shows an analog television receiver according to a further embodiment of the invention.

FIG. 8 shows an analog television receiver 800 according to a further embodiment of the invention. Analog television receiver 800 comprises a signal receiver 801 such as an antenna, adapted to receive an analog television signal. The analog television signal comprises a field synchronizing signal for synchronizing fields of a television image to be derived from the analog television signal. Furthermore, analog television receiver 800 comprises a processing unit 802 adapted to determine a reference signal based on an (ideal) field synchronizing signal and a further reference signal based on the field synchronizing signal of the received analog television signal. Analog television receiver 800 further has an equalizer 803 adapted to equalize the analog television signal based on a reference signal and further reference signal.

The "ideal" field synchronizing signal might be stored in a memory of the receiver 800.

Alternatively to deriving the reference signal from the "ideal" field synchronizing signal, i.e. from a field synchronizing signal as specified in a standard for which the receiver is used, the reference signal may be pre-stored in a memory of receiver 800. In other words, reference signals such as 420, 620 shown in FIGS. 4 and 6 or only parts thereof may be stored in receiver 800. These stored reference signals may then be compared to the further reference signals determined based on the received analogue television signal.

Figure 9:
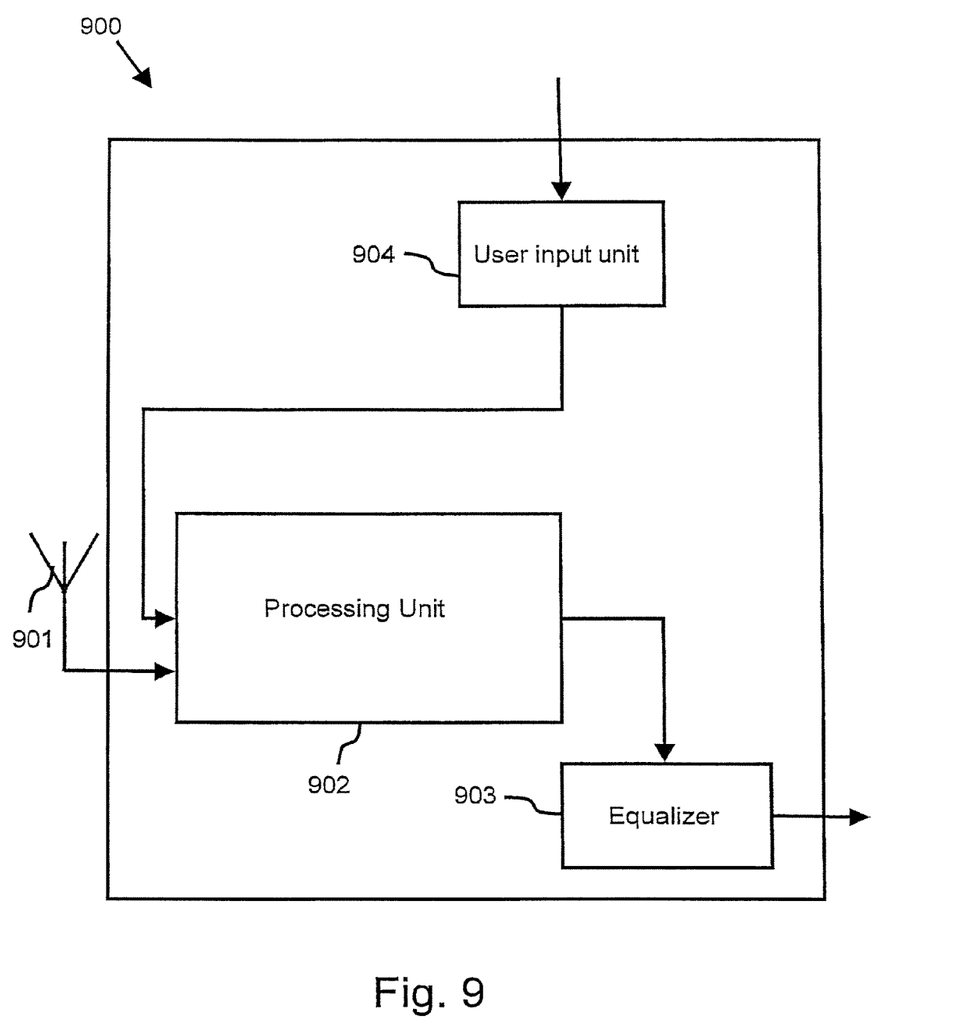
FIG. 9 shows a further analog television receiver according to a further embodiment of the invention.

FIG. 9 shows a further analog television receiver 900 according to a further embodiment of the invention, comprising a signal receiver 901 for receiving television signals, a processing unit 902 and an equalizer 903. Analog television receiver 900 may provide, for example in a memory, one or more undistorted, i.e. ideal, reference signals according to different television standards (or alternatively ideal field synchronizing signals suitable for deriving reference signals as above described). For example reference signals 420 and 620 shown in FIGS. 4 and 6, respectively, may be provided. These different reference signals may be selected depending on a user input so that the equalization can be user controlled. Depending on the user selected reference signal, the further reference signal will be calculated accordingly. I.e. the further reference signal in processing unit 902 will e.g. be calculated as shown in FIG. 5 (when reference signal 420 is selected) or the further reference signal will be calculated as shown in FIG. 7 (when reference signal 620 is selected).

For a better understanding of the operation and effects of the methods and devices described above, the following FIGS. 10, 11 and 12 illustrate several views of output television images.

Figure 10:
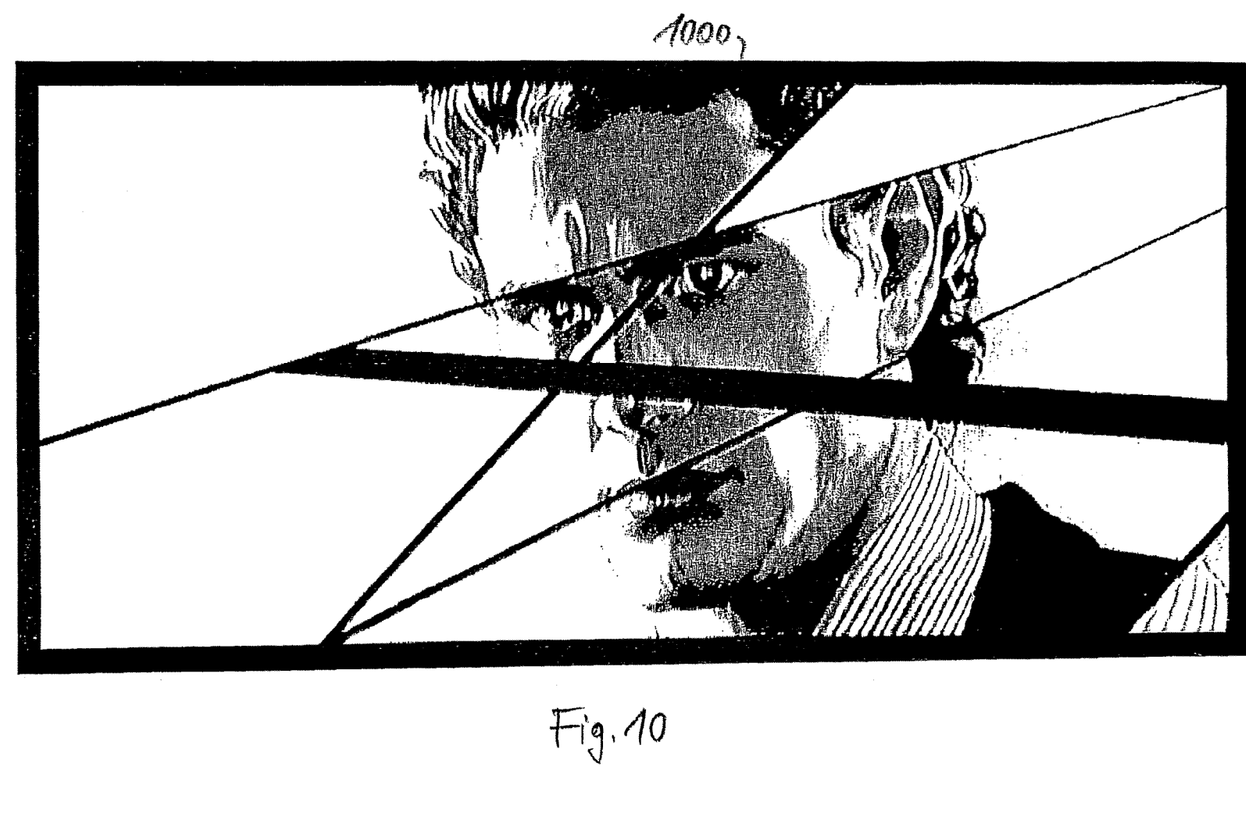
FIG. 10 shows an exemplary original television image.

FIG. 10 shows an original television image 1000 which is not subject to signal distortions.

Figure 11:
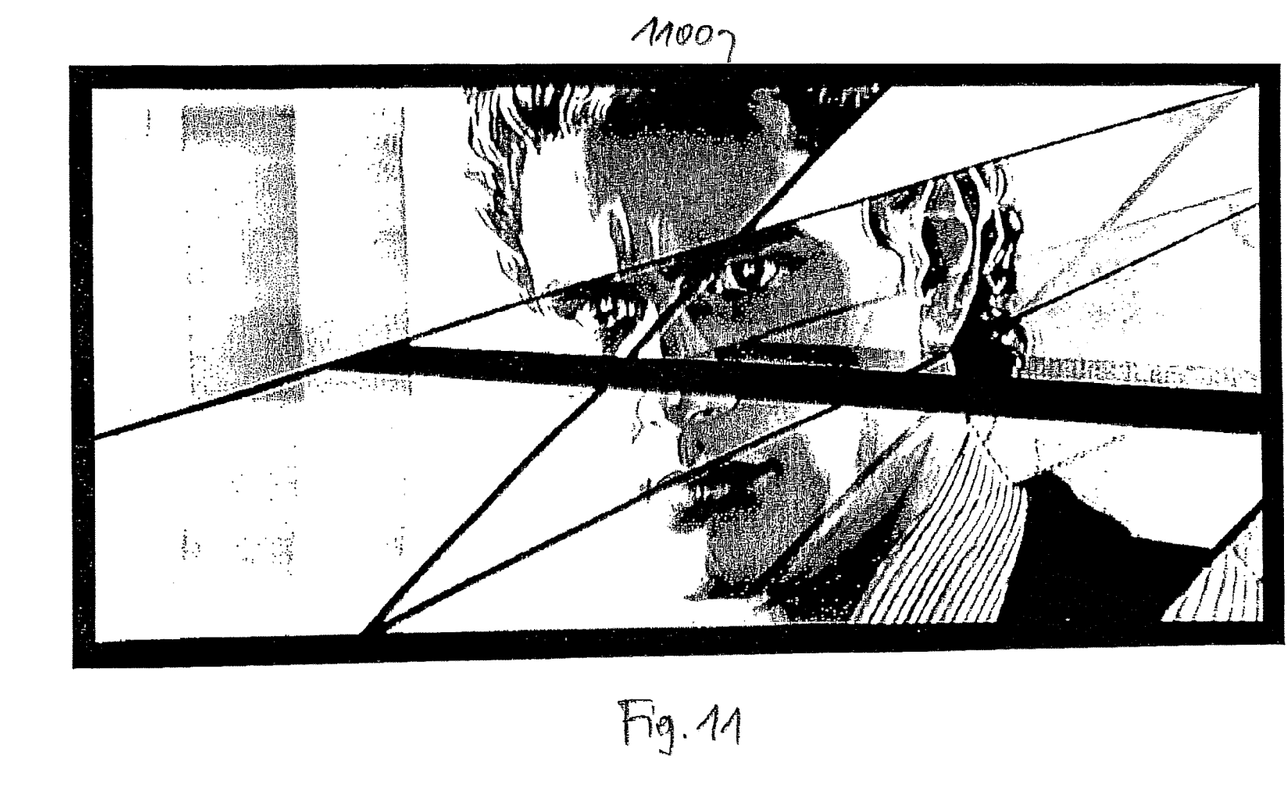
FIG. 11 shows an exemplary distorted television image.

FIG. 11 shows a distorted television image 1100 without equalizing. Image 1100 has been obtained from a distorted analogue television signal. The distortions may result from echoes, phase shifting and/or amplitude alterations or other such artifacts.

Figure 12:
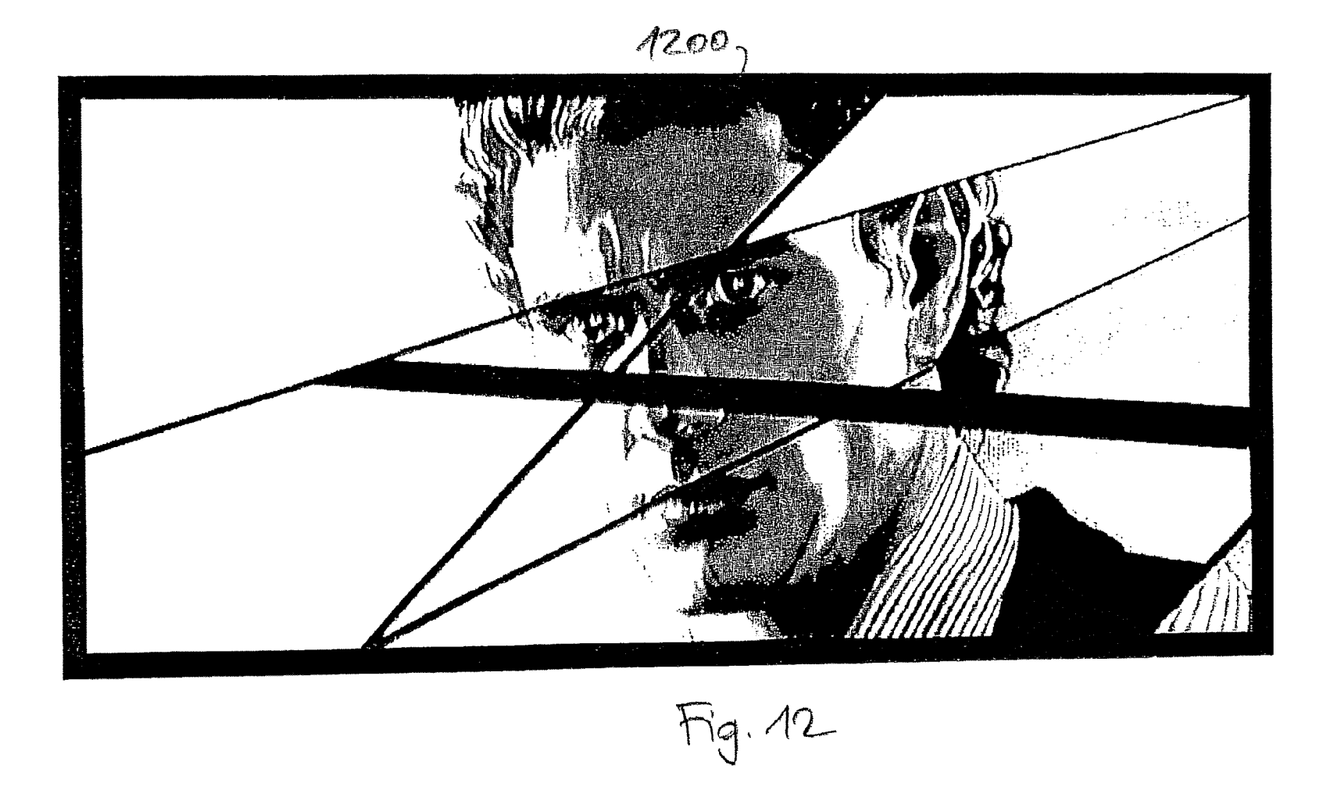
FIG. 12 shows an exemplary equalized television image.

FIG. 12 shows the television image 1200 derived from the same distorted analogue television signal used for image 1100 in FIG. 11. However, this time an equalizing based on the above explained reference signal and further reference signal has been performed.

When comparing images 1100 and 1200 of FIGS. 11 and 12, it can be seen that there are much fewer artifacts in the image 1200 than in the image 1100.

The following elucidation may help to get a still better understanding of embodiments of the invention.

The reference signal above can be derived from parts of the field-synchronizing waveforms. According to ITU recommendation BT.470-6 the field-synchronizing waveforms are part of most standardized TV signals all over the world and are defined either according to FIG. 4 (all systems except M) or FIG. 6 (system M). Respective reference signals 420, 620 as described in detail above may be determined.

In FIG. 6, both, the first rising edge 628 and/or the second falling edge 630 are suitable and equivalent candidates for a reference signal. As the preceding signal is zero for a longer time interval a misinterpretation of echoes which result from preceding signals is effectively avoided.

Moreover, the signal 620 in FIG. 6 is quite precisely specified in all standards described by ITU-R BT.470-6. The receiver therefore may e.g. try to equalize the received signal by reconstructing the edges based on the assumption that the transmitted edge is perfectly known at the receiver side. FIGS. 10-12 show a transmitted, received and equalized video signal. The equalization is based on the reference signal 620 depicted in FIG. 6 and on the latter assumption of perfect signal knowledge at the receiver side.

The processing of the GCR signals described in ITU-R BT.1124-3 is also based on a subtraction of two different TV lines (4-field difference) and an analysis of a rising edge. Due to the similar processing only few changes are necessary to extend a GCR signal based ghost cancellation algorithm such that it can handle the derived reference signal shown in FIG. 4 or 6.

Summarizing, the above described embodiment guarantee a good equalization of TV signals even when there is no standardized ghost canceling reference signal available. The reference signal described can be derived from most TV standards like NTSC, PAL or SECAM and allows for a cost-efficient extension of a reference based ghost canceller algorithm by blind ghost cancellation. The described reference signal could also be used in addition when a ghost canceling reference signal is in fact available. This may result in further enhancement of the image quality.

The invention claimed is:

1. A method for processing an analog television signal, comprising:
   determining a reference signal based on at least one field synchronizing signal; and
   equalizing the analog television signal based on the reference signal, wherein
   the reference signal is determined by calculating a difference between a first part of a first field synchronizing signal and a second part of a second field synchronizing signal, wherein the first and second parts are selected such that the reference signal is non-zero.

2. The method of claim 1, wherein the first part of the first field synchronizing signal is determined based on a first predetermined line of a first field corresponding to said first field synchronizing signal and wherein the second part of the second field synchronizing signal is determined based on a second predetermined line of a second field corresponding to said second field synchronizing signal.

3. The method of claim 2, wherein prior to the calculating of the difference, the first and the second parts are aligned to each other based on the first and second predetermined lines.

4. The method of claim 2 or 3, wherein the predetermined line of the first field is a first line of the first field, and the predetermined line of the second field is a first line of the second field.

5. The method of claim 2 or 3, wherein prior to the calculating of the difference, the first part and the second part are offset with respect to each other dependent on a standard of the analogue television signal, prior to the calculating of the difference.

6. The method of any of claims 1, 2 or 3, wherein the field synchronizing signal is of a predetermined broadcasting standard.

7. The method of any of claims 1, 2 or 3, wherein the field synchronizing signal is an undistorted field synchronizing signal and a further reference signal is derived from a distorted field synchronizing signal in the same manner as the reference signal from the undistorted field synchronizing signal, wherein the equalizing is based on a comparison between the reference signal and the further reference signal.

8. An analog television receiver comprising:
   a receiver adapted to receive an analog television signal,
   a processing unit adapted to determine a reference signal based on at least one field synchronizing signal; and
   an equalizer adapted to equalize the analog television signal based on the reference signal, wherein
   the processing unit is adapted to determine a further reference signal based on a distorted field synchronizing signal.

9. The analog television receiver of claim 8, further comprising:
   a memory, wherein the further reference signal is a predetermined reference signal stored in the memory.

10. The analog television receiver of claim 8 or 9, wherein the processing unit is adapted to compare the reference signal and the further reference signal.

11. An analog television receiver comprising:
    a receiver adapted to receive an analog television signal;
    a processing unit adapted to determine a reference signal based on at least one field synchronizing signal; and
    an equalizer adapted to equalize the analog television signal based on the reference signal, wherein,
    the processing unit is adapted to determine a further reference signal based on a distorted field synchronizing signal, the processing unit is adapted to compare the reference signal and the further reference signal.

12. The analog television receiver of claim 8, 9 or 11, further comprising:
    a user input unit adapted to select one of a plurality of reference signals based on a user input.

13. The analog television receiver of claim 11, wherein the equalizer is adapted to equalize the analog television signal based on an output of the processing unit.

14. An analog television receiver comprising:
a receiver adapted to receive an analog television signal,
a processing unit adapted to determine a reference signal based on at least one field synchronizing signal; and
an equalizer adapted to equalize the analog television signal based on the reference signal, wherein the processing unit is adapted to determine the reference signal based by calculating a difference between a first part of a first field synchronizing signal and a second part of a second field synchronizing signal, wherein the first and second parts are selected such that the reference signal is non-zero.

* * * * *